US005863372A

United States Patent [19]
Fabel

[11] Patent Number: 5,863,372
[45] Date of Patent: *Jan. 26, 1999

[54] METHOD FOR PRODUCING BOOKLETS PRINTED WITH VARIABLE INFORMATION AND FORM THEREFORE

[75] Inventor: Warren M. Fabel, Delray Beach, Fla.

[73] Assignee: Laser Substrates, Inc., Boca Raton, Fla.

[ * ] Notice: The terminal 25 months of this patent has been disclaimed.

[21] Appl. No.: 240,870

[22] Filed: May 10, 1994

[51] Int. Cl.[6] .......... B32B 31/00

[52] U.S. Cl. .......... 156/277; 156/265; 156/310; 156/908; 412/6

[58] Field of Search .......... 156/277, 908, 156/477.1, 202, 204, 558, 559, 560, 265, 259, 310; 281/21.1; 412/6, 7

[56] References Cited

U.S. PATENT DOCUMENTS

| | | | |
|---|---|---|---|
| 3,788,921 | 1/1974 | Polit et al. | 156/908 X |
| 4,244,069 | 1/1981 | Hale | 156/908 X |
| 4,828,636 | 5/1989 | Rausing | 156/204 |
| 4,851,075 | 7/1989 | Parker | 156/559 X |
| 5,011,187 | 4/1991 | Hunder et al. | 281/21.1 X |
| 5,052,872 | 10/1991 | Hunder et al. | 281/21.1 X |

*Primary Examiner*—James Engel
*Attorney, Agent, or Firm*—Quarles & Brady LLP

[57] ABSTRACT

A process is provided for producing booklets, such as bank check booklets, having variable printed information. A paper stock for the booklets, perforated for separation into panels, is coated with a catalyst along certain surfaces. After passage through a non-impact printer, such as a laser printer, the panels are separated and stacked in such a way that the surfaces coated with a catalyst extend along an edge of each panel, with these edges being aligned in a common direction. When the coated edges of each stack of panels are subsequently pressed against an adhesive layer coated on a binding cover, the catalyst begins the process of hardening the adhesive in the layer.

21 Claims, 7 Drawing Sheets

METHOD FOR PRODUCING BOOKLETS PRINTED WITH VARIABLE INFORMATION AND FORM THEREFORE

BACKGROUND OF THE INVENTION

1. Field of the Invention

This invention relates to the production of booklets using a non-impact printer, and more particularly, to the production of such booklets having different information on each sheet, such as check books.

2. Background Information

The vast majority of bank checks in use today are printed by organizations specializing in the production of checks for banks and their customers. Such checks typically include both fixed and variable information. The fixed information, which can remain the same from one customer to another, includes graphical designs and the lines indicating where the date, payee, amount, and signature should be written. The variable data includes information identifying the account holder, such as name and address and account number, and data which varies from one check to the next, such as a check number assigned in sequence. The name of the bank, together with its address and logo, are also often treated as variable data by an organization printing checks for a number of banks, being printed along with the name and address of the customer. The account number of the customer, together with a number identifying the bank and the check number, are printed along the bottom of each check using a magnetic ink for the MICR (Magnetic Ink Character Recognition) process.

The organization printing the checks also binds them into booklets, each of which typically contains twenty-five sequentially numbered checks. Each check is separated from a top strip, or alternately from a tab or stub extending from the left end of the check, by a perforated line, which facilitates the subsequent removal of the check from the booklet as it is used. The top strips or stubs of each booklet are stapled together and glued to a “U” shaped protective binding strip.

When a bank customer opens a new checking account, that customer typically wants immediate access to funds placed in the new account. However, the order for checks, typically placed at the time the account is opened, takes several weeks to be filled. To overcome this delay, the customer is given a small supply of temporary, “starter checks” supplied by the bank. These starter checks typically have fixed information, together with the magnetic ink characters necessary to route each check. Other variable information, such as the customer’s name, address and phone number, check number, are not present in the starter checks. Because the starter checks represent real pre-assigned account numbers, they must be kept in a vault by a bank prior to being given to a new account customer, thereby creating logistical problems for the bank. Further, the limited number of checks in the starter kits many times is insufficient for a new account customer, who does not get an adequate supply of permanent checks for a couple of weeks.

Another problem with starter checks quickly arises from the fact that these “starter” checks are not as readily accepted by local merchants as permanent checks, particularly since they are not pre-printed by with the name and address of the customer. This results in inconvenience to the customer, who must limit the amount of money deposited in the account until the permanent checks arrive.

A process is therefore needed to facilitate the printing of checks in a form acceptable to local merchants at the bank at the time an account is opened. These checks should have the same type of variable information as the permanent checks which are presently produced by the check printing organizations. Furthermore, an efficient process is needed to allow the binding of checks printed at the branch level into booklets for ease of use by the customer.

Another common problem faced by bank customers occurs when the customer runs out of checks. Normally, nothing can be done until the check printing organization prints and sends the checks, which takes a couple of weeks. It would be of great convenience to a customer to go to his local branch bank and have new checks immediately printed on the same equipment used to print the initial supply of checks. From the bank’s point of view, the printing of checks immediately and locally not only is a good customer service, but also can be a substantial profit center for the bank.

SUMMARY OF THE INVENTION

In accordance with one aspect of the invention, there is provided a process of producing booklets having a plurality of sheets contained in a cover, the sheets initially being in a configuration suitable for printing in which the individual sheets are separated by perforations. The cover has a first material on a portion thereof, the first material, when contacting a second material, forming a bond. The method includes the steps of affixing the second material through the perforations and separating the sheets at the perforations, so that a first edge of each separated sheets has the second material affixed thereto. The method additionally includes the steps of aligning the first edges into a stack and placing the stack in the cover so that the aligned first edges are against the first material.

In accordance with another aspect of the invention, there is provided a material for producing booklets of a plurality of individual sheets and a cover. The material includes an elongated web and a plurality of perforated lines dividing the web into a plurality of panels. In addition, the material includes a catalyst coated along the perforated lines, the catalyst being of a type initiating hardening within an adhesive material in the cover.

BRIEF DESCRIPTION OF THE DRAWINGS

Several preferred embodiments of the subject invention are hereafter described with specific reference being made to the following Figures, in which.

DETAILED DESCRIPTION

Figures 1, 2:
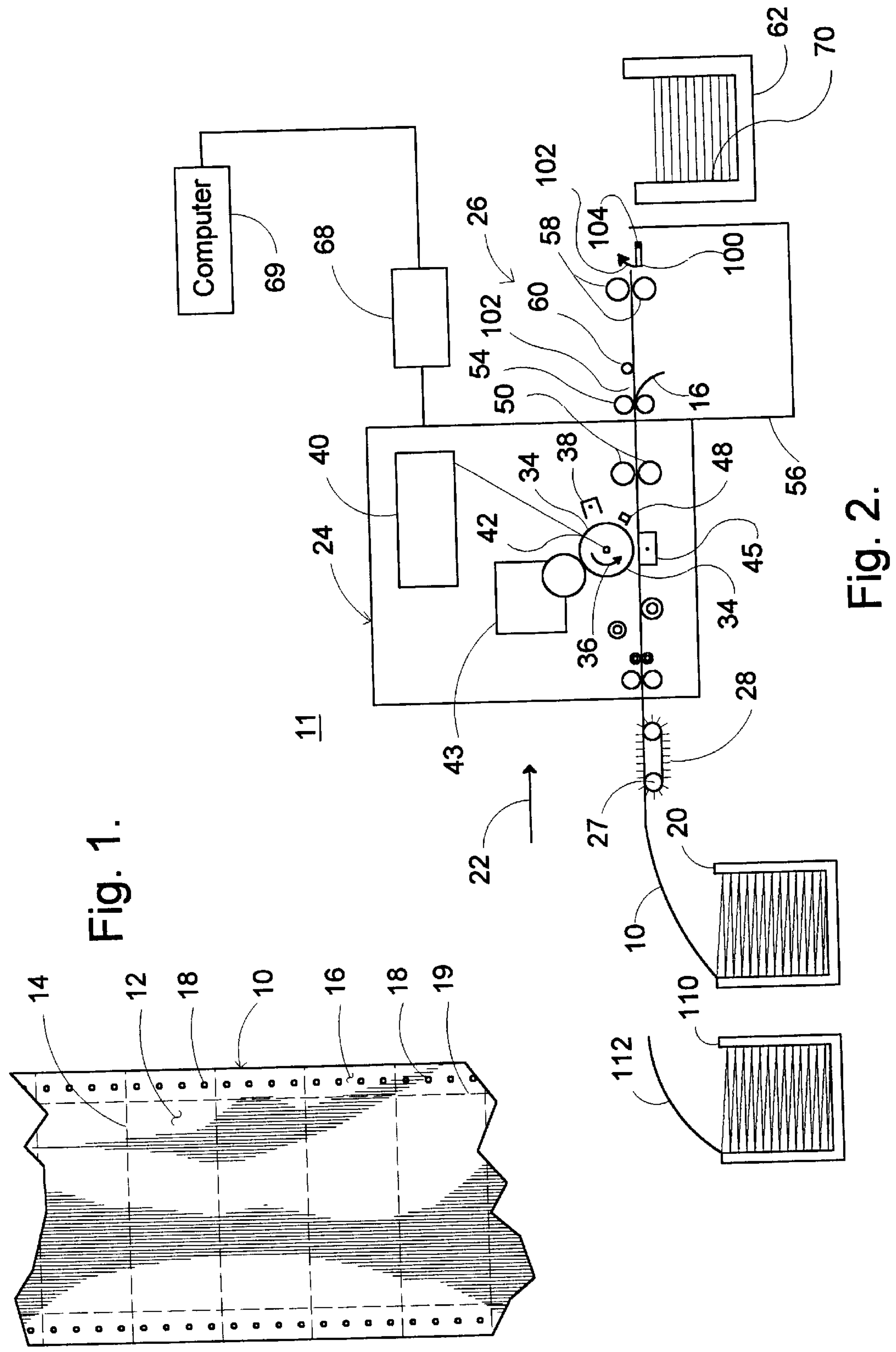
FIG. 1 is a plan view of paper stock used for the preparation of check booklets according to this invention.
FIG. 2 is a schematic diagram of apparatus used in the preparation of check booklets from the paper stock of FIG. 1.

FIG. 1 is a plan view of a paper stock 10 used in accordance with a first embodiment of the present invention in the production of check booklets, while FIG. 2 is an schematic view of equipment 11 used to produce check booklets from the paper stock 10 of FIG. 1.

Referring first to FIG. 1, paper stock 10 is formed from an elongated paper web, with each panel 12, sized to ultimately be formed into an individual check, being separated from adjacent panels by means of transverse perforated lines 14. Paper stock 10 also includes an edge strip 16 with paper feed holes 18, extending along each edge, separated from the panels 12 by means of a longitudinal perforated line 19. Paper feed holes 18 are preferably located in a fixed offset relationship with respect to transverse perforated lines 14, so that the timing of a device printing information on the various panels 12 in a fixed offset relationship with each perforated line 14 can be established by the passage of holes 18 past a specific point.

Referring to the equipment 11 in FIGS. 2, paper stock 10 for making the booklets is drawn from a fan folded supply stack 20, in the direction of arrow 22, through a printer 24, and into a bursting station 26, in which the individual panels 12 are separated from one another and from edge strips 16. In supply stack 20, paper stock 10 is folded in alternating directions along transverse perforated lines 14 and is applied through a splicing station 27 having a number of pins 28 for aligning a new supply of paper with the old supply.

Within printer 24, the conventional steps of a non-impact printing process are applied to the paper stock 10. For example, a photoconductive material on the surface of a drum 34, rotating in the direction of arrow 36 at a peripheral speed equal to the speed of paper 10, is charged by means of a charge corona 38 and discharged by means of scanning, modulated laser light from laser print head 40 at drum imaging area 42. The laser light is modulated according the image pattern to be printed on each check. Next, a toned image is formed on the surface of drum 24 by developer unit 43, in the latent image pattern previously formed by laser light. This toned image is subsequently transferred to the paper stock 10 passing between the drum 34 and a transfer corona 45. Excess toner left on the drum 34 after the transfer process may be removed by a cleaning station 48 before the charging process at charge corona 38 is again applied. The toner within developer unit 34 preferably contains sufficient magnetic material to allow characters printed on paper stock 10 to be recognized subsequently by the MICR process. Before exiting printer 24, paper stock 10 is moved between heated fuser rolls 50, where the toner powder is softened and pressed into the surface of the paper. As described, printer 24 may be any commercially available laser printer.

Paper stock 10 is driven into bursting station 26 from printer 24. Near each side of the paper stock 10, a pair of slitter wheels 54 slit the stock 20 along longitudinal perforated lines 19. In this manner, edge strips 16 are removed to be discarded in a waste container 56. Burster rolls 58 are driven to pull the paper at a faster speed than the speed provided by other elements in the paper path, such as fuser rolls 50 and the paper drive mechanisms within printer 24. This difference in drive speeds places a stress on the paper as it passes between burster rolls 54 and 58. While this stress is inadequate to tear the paper stock 10 between perforated lines, it easily causes the paper 10 to be separated at transverse perforated lines 14, as the paper is pulled over a burster bar 60. The individual panels 12, having thus been separated from one another and from edge strips 16 are dropped into an output tray 62.

Before the paper stock 10 is used in the process shown in FIG. 2, fixed information may be printed in each panel 12. This information may include a scenic background for each check, the name, address, and logo of the bank, and lines indicating where the check amount, date, and signature should be written. Thus, only the name, address, and phone number of the bank customer, together with the magnetically readable (MICR) information and the individual check numbers, needs to be printed with printer 24. In this way, the high resolution, full color images which can be obtained using conventional printing processes are used with the variable information printed on printer 24 for each check. This combination of printing processes can easily produce checks which are both aesthetically pleasing and difficult to counterfeit. The simplicity of operation of the printing system of FIG. 2 allows high quality checks to be printed, for example, at a bank branch where a new account is opened. Of course, printer 24 can be used to print the fixed information, as well.

The ability of a laser printer such as printer 24 to produce different types of images may be further used to advantage. For example, checks may be imprinted with a copy of a photograph of the customer for improved identification, or, if the system is used to produce a booklet of traveler's checks, the "first signature" may be imprinted on each check, so that the security of the traveler's check system can be obtained without a need for the customer to sign each check.

The printing process of printer 24 is controlled by a controller 68. The generation of a signal to modulate the laser in printer 24, in accordance with this data and in accordance with one or more type fonts used to produce alphanumeric characters, is performed by conventional well known processes and algorithms. The data required for the operation of the printing process, such as the name, address, and account number of the customer for whom the checks are being printed, is supplied to controller 68 through a stand alone personal computer 69 and/or through a terminal link to the mainframe computer system, for example, of a bank producing the checks. Controller 68 and computer 69 operate together in a manner similar to the manner any personal computer controls a printer, such as a laser printer, attached thereto. Controller 68 counts the checks as they are printed. Preferably, the individual check number printed on each check is decremented by one, with the printing of each check, from a maximum number supplied, along with the customer name, etc., as part of the data for the printing process. In this way the printed checks filling output tray 62 are ordered so that, when the process is completed, the top check has the lowest number, the next check has a number which is one more than the lowest number, and so on, with each check being printed on the upward facing side of a panel 12.

Figure 3:
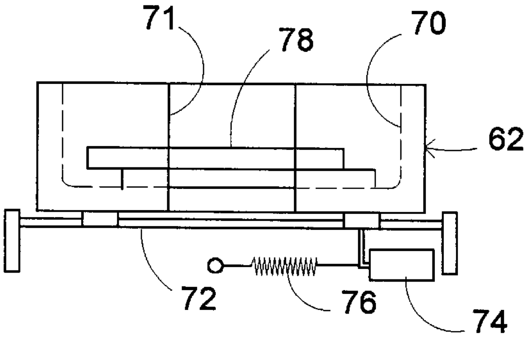
FIG. 3 is an end elevation view of an output tray for receiving printed checks in the apparatus of FIG. 2.

Referring now to FIG. 3, an end elevation view of output tray 62 is shown, in which a cavity 70 is provided for receiving the checks printed on panels 12 (shown in FIG. 1). Tray 62 also includes a slot 71 to facilitate the manual removal of checks stacked in cavity 70.

Since check booklets are typically produced to each include a fixed number, such as twenty-five, consecutively numbered checks, output tray 62 is moved through a transverse offset distance along rails 72, between alternating positions, each time twenty-five checks have been printed and dropped into the cavity 70. A solenoid 74, operating against the force provided by an extension spring 76, is used to move the tray 62 in this way. Since the checks which have already been printed and stacked move with the tray 62, continued operation of the printing process produces, within cavity 70, a number of stacks 78, each of which includes twenty-five consecutively numbered checks. The various stacks 78 are easily separated from each other, since are transversely staggered by the offset distance provided by the transverse motion of output tray 62. After checks are printed in this way, the individual stacks 78 of checks are separated, one from another, to be bound into booklets.

Figure 4:
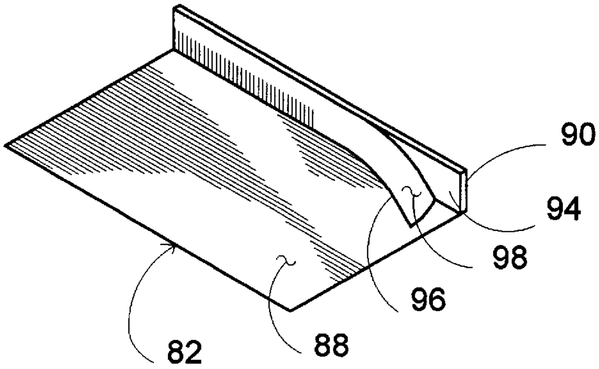
FIG. 4 is an isometric view of a cover used in the binding of each check booklet produced with the apparatus of FIG. 2.
Figure 5:
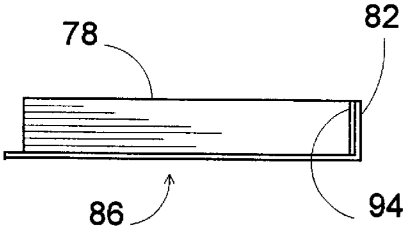
FIG. 5 is an end elevation view of a finished check booklet bound using the cover of FIG. 4.

Referring now to FIGS. 4 and 5, where FIG. 4 shows an isometric view of a binding cover 82 used for each booklet, and FIG. 5 shows an end elevation view of the finished booklet 86. This binding process is used to provide the security and convenience of use otherwise associated with checks printed by organizations specializing in the production of checks.

Referring specifically to FIG. 4, binding cover 82, which includes a back flap 88, and an end portion 90 is preferably composed of a card stock material, with a polymer adhesive layer 94 coated inside end portion 90, and with a protective strip 96 covering the adhesive layer. The internal width of end portion 90 matches the thickness of each check stack 78. Protective strip 96, which has a silicon release coating on its internal side 98, preferably protects and maintains adhesive layer 94 in a soft, or semi-liquid, state until the binding cover 82 is used. In FIG. 4, protective strip 96 is shown partly peeled back to reveal adhesive layer 94. Thus, binding cover 82 is made ready for use by pealing away and discarding protective strip 96.

Referring to FIG. 5, a finished booklet 86 is formed when a check stack 78 is pushed against exposed adhesive layer 94. The finished booklet 86, preferably having the general size and shape of a typical booklet of checks prepared by conventional processes, can be fit into a standard vinyl or leather cover (not shown) presently used in a similar manner.

In a preferred embodiment of this invention, a catalyst is coated on the exposed edges formed by the separation of individual panels 12 along transverse perforated lines 14 to form checks within stack 78. The catalyst is used to begin the process of hardening the soft adhesive layer 94. Several methods for coating the catalyst on paper stock 10, before it is supplied for use in the process of FIG. 2, are discussed below. The adhesive in layer 94 is preferably of a type which, when cured, forms a strong enough bond with the check panels 12 such that the subsequent removal of a single panel 12 leaves a strip of paper, rather than carrying a strip of adhesive with the paper. A chemical weakening of the paper adjacent the adhesive bond, by means of the catalyst, may also be used to facilitate easy separation.

Referring again to FIG. 2, the process of printing checks may be continued from one job, or order, to another without pausing. That is, the customer identification and account number may be changed from one panel 12 to the next panel 12 without stopping the process. However, if a new job is not available for printing when one job is completed, the process must be stopped to await the next job. As the process is stopped, paper stock 10 must be advanced in the direction of arrow 22 far enough that the last check printed on a panel 12 is burst from the stock 10. As this occurs, at least one panel 12 advances past transfer corona 45 without the transfer of a toned image. Furthermore, when the process is again started to print checks for a new job, paper stock 10 is advanced as a latent image is formed and developed with toner by the processes associated with drum 34. This additional advancement of paper stock 10 in the direction of arrow 22 results in the movement of at least an additional panel 12 past transfer corona 45 without the transfer of a toned image.

Thus, each time the printing process is stopped between jobs, several "blank" panels 12, without the printed information otherwise provided by the process, are moved from printer 24 to bursting station 26. As this occurs, a deflecting vane 100 within bursting station 26 is rotated in the direction of arrow 102, about pivots 104, by means of a solenoid (not shown). In this way, the "blank" panels 12 are deflected to fall downward into waste container 56. The timing of this operation is easily established within controller 68, which controls the printing process. Alternatively, the paper movement mechanisms may reverse feed the paper back to the original starting point, or the blank sheets may be used to separate each group of twenty-five checks by moving them to the side in place of the mechanism of FIG. 3.

When the printing process is stopped, the various wheels and rollers associated with the movement of paper stock 10 are stopped. The rotation of printing process elements, such as drum 34 and fuser rolls 50 is also stopped. A conventional fuser roll opening and closing mechanism (not shown) may be used to separate the fuser rolls 50 as the movement of paper stock 10 is stopped.

One or more alternate supply stacks 110 may be provided at the left of the first supply stack 20, with each alternate supply stack 110 provide an alternate paper stock 112 for the printing process. In this way, variations in paper color and in the type of pre-printed fixed information may be provided, and the continuation of the printing process. The paper stock running through printer 24 may be switched from one supply stack to another by stopping the printing process, by separating the paper stock extending from the printer to splicing station 27 at a transverse perforation 14 and by splicing a new paper stock to the old paper stock using tape. This splicing operation is most easily carried out at a perforation 14 extending within splicing station 27, using pins 28 to align the paper of the two stacks 10 and 110. As in other times when the printing process is stopped, "blank" panels 12 will be produced, which can be disposed through the operation of deflecting vane 100.

As previously discussed with reference to FIG. 5, a catalyst, applied to transverse perforation lines 14 (shown in FIG. 1) during the process of manufacturing the paper stock 10, is preferably used to begin the process of solidifying the adhesive used in binding the individual checks to a binding cover 82. The catalyst is preferably in the form of a powder, or of a liquid which quickly dries to leave a residue providing the desired chemical reaction in contact with the adhesive. Several methods for applying the catalyst will now be discussed, with references being made to FIGS. 6–11. A first method of applying this catalyst is shown in FIGS. 6–8, where FIG. 6 shows the application of the catalyst to a folded stack 120 of paper stock 10, FIG. 7 shows the folded edges of paper stock 10 in stack 120 and FIG. 8 shows a cross-sectional elevation of one of the rollers of the apparatus of FIG. 6.

Figure 6:
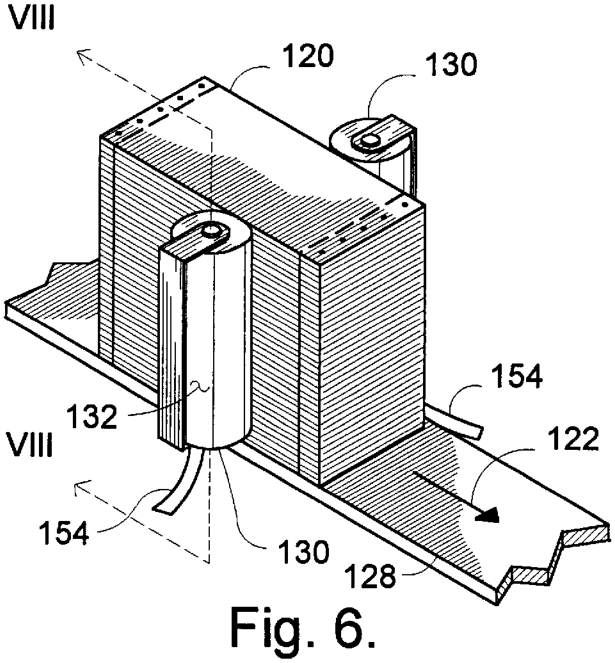
FIG. 6 is an isometric view of apparatus used in coating a catalyst along folded edges at perforated lines of the paper stock of FIG. 1.
Figure 7:
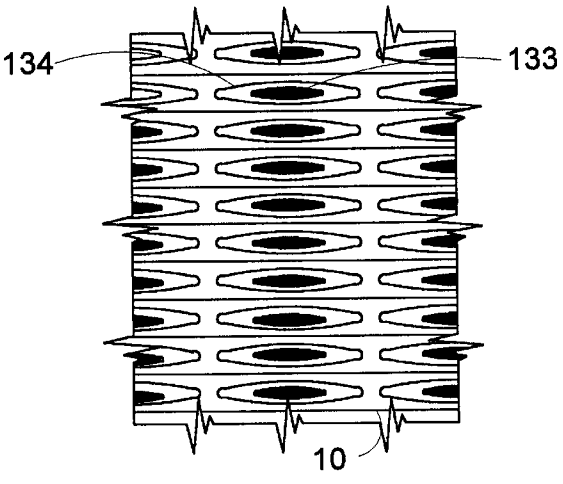
FIG. 7 is an elevation view of the folded edges of the paper stock treated in the apparatus of FIG. 6.

Referring first to FIG. 6, a folded paper stack 120, in which the paper stock 10 shown in FIG. 1 is folded in alternating directions along transverse perforation lines 14, is moved along a production line in the direction of arrow 122 by means of a conveyer belt 128. As the paper stack 120 moves between a pair of rollers 130, a catalyst on the surface 132 of each roller 130 is applied to the adjacent surfaces of paper stack 120. As shown in FIG. 7, when the paper stock 10 is folded in this way individual perforations 133 expose adjacent cut or torn surfaces 134, which are particularly well suited for picking up a catalyst from the surface of rollers 130.

Figure 8:
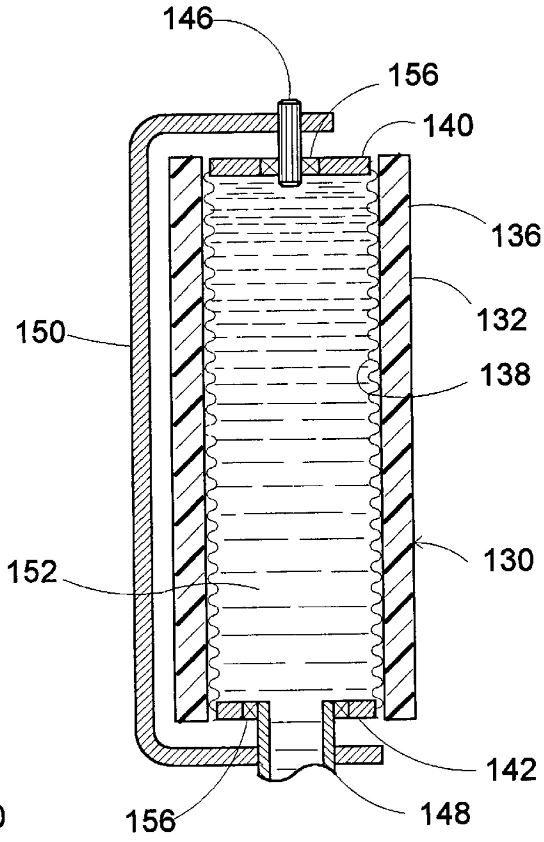
FIG. 8 is a cross-sectional elevation view of a roller of the apparatus of FIG. 6, taken as indicated by section lines VIII—VIII in FIG. 6.

Referring to FIG. 8, each roller 130 includes a soft outer covering 136 adhered over a the outer surface of a mesh cylinder 138, which extends between an upper end cap 140 and a lower end cap 142. Roller 130 is rotatably mounted on an upper shaft 146 and on a hollow lower shaft 148. A support bracket 150 holds upper shaft 146 in place relative to lower shaft 148. The catalyst 152 is pumped into mesh cylinder 138 through hollow lower shaft 148, which is supplied though a system of hoses 154 (shown in FIG. 6). Sealed bearings 156 prevent the outward leakage of the catalyst 152 while allowing rotation of roller 130. Outer covering 136 is a soft, porous material, such as an open cell elastomeric foam or a carpet like brush having a porous backing. Thus, the catalyst, which may be a liquid or a powder dispersed in a liquid, is pumped through the mesh cylinder 138 and through the outer covering 136 to the outer surface 132 of roller 130.

Referring again to FIG. 6, the catalyst is removed from the surface 132 of each roller 130 by contact with the edge surfaces of paper stack 120. While, each roll 130 is preferably free to turn with motion imparted from the movement of paper stack 120, a motor drive may be used to rotate the rolls 130 at a different speed, so that the rate at which the catalyst is brought into contact with these surfaces is increased.

Figure 9:
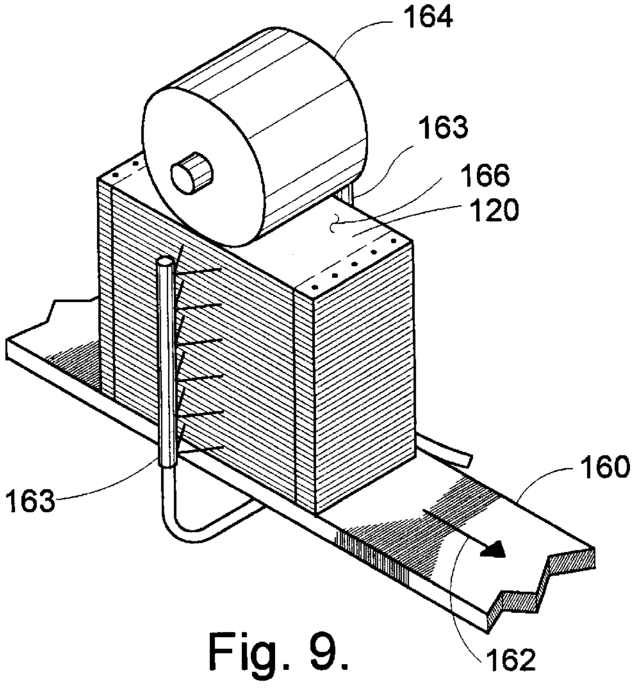
FIG. 9 is an isometric view of an alternative apparatus used in coating a catalyst along folded edges at perforated lines of the paper stock of FIG. 1.

FIG. 9 shows a second method of applying catalyst to the folded edges of paper stack 120. With this method, the paper stack 120 is moved by a conveyer belt 160 in the direction indicated by arrow 162, past a manifold 163 having a number of nozzles through which the catalyst is sprayed along the adjacent side of the paper stack 120. With this method, the adjacent sheets of paper within stack 120 are clamped tightly together by a wheel 164 rolling on a top surface 166 of the stack 120. This clamping prevents coating the catalyst on surfaces of panels 12 (shown in FIG. 1) instead of only on the edges.

Figure 10:
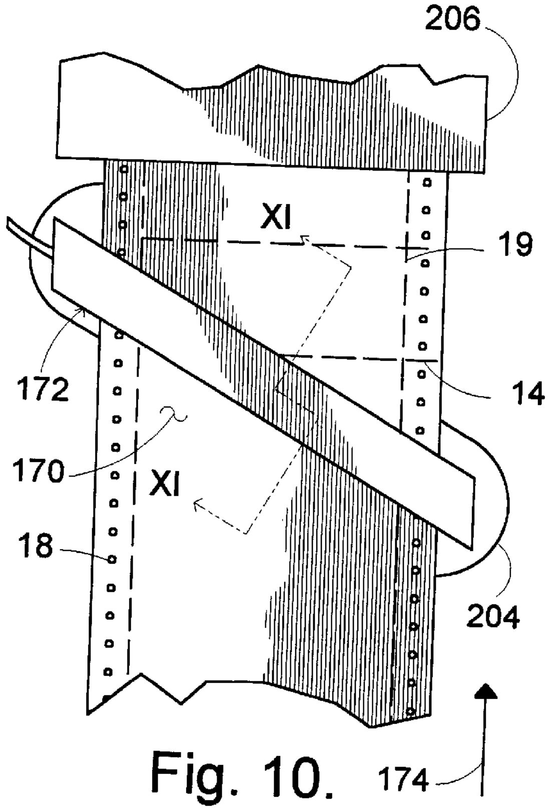
FIG. 10 is a plan view of apparatus used to form perforations by means of jets of liquid catalyst in the manufacture of the paper stock of FIG. 1.
Figure 11:
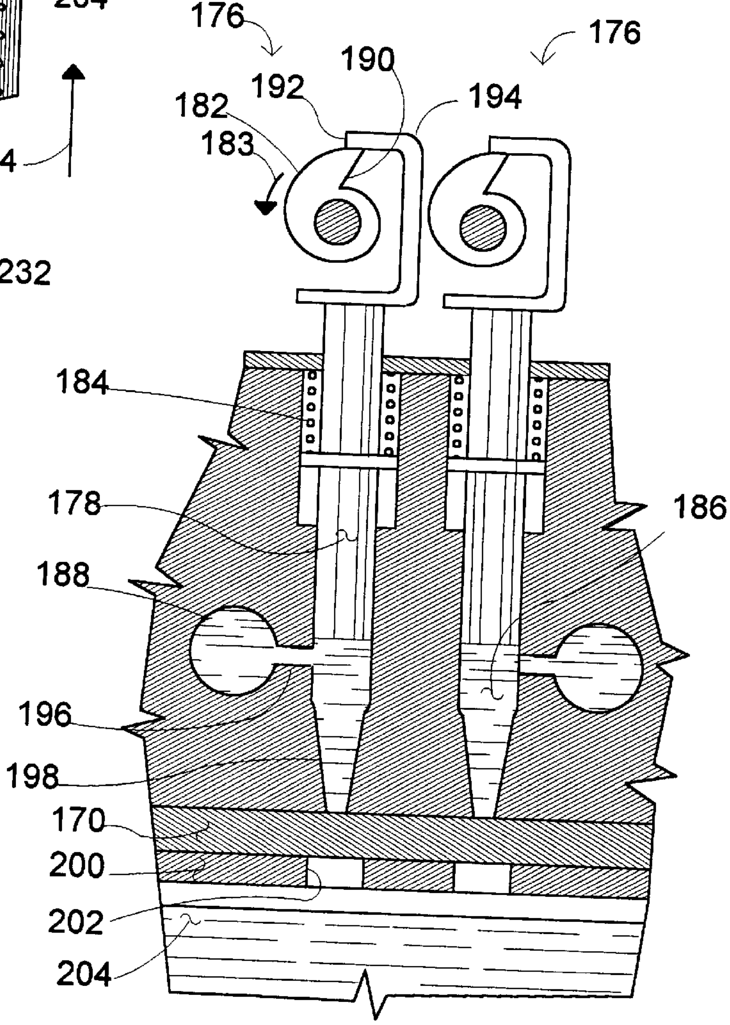
FIG. 11 is a cross-sectional elevation of a mechanism used in the formation of individual perforations within the apparatus of FIG. 10, taken in the direction indicated by section lines XI—XI in FIG. 10.

FIGS. 10 and 11 show a third method of applying catalyst to the paper 10, in which a liquid catalyst is forced through paper 10 to form the perforations. Specifically, FIG. 10 is a plan view of the apparatus used in the process, while FIG. 11 is a cross-sectional elevation, taken as indicated by section lines XI—XI in FIG. 10, showing a mechanism used in the formation of individual perforations.

Referring first to FIG. 10, a paper stock 170 having feed holes 18 and longitudinal perforated lines 19, without transverse perforated lines being initially provided, is fed through a perforating station 172 in the direction of arrow 174. In perforating station 172, transverse perforated lines 14 are produced by means of high pressure jets of liquid catalyst. Referring to FIG. 11, within perforating station 172, a catalyst injection station 176 is provided for each position at which a perforation hole is to be formed in a transverse perforated line 14. The injection stations 176 may be provided in two or more rows to provide space for the stations in spite of the closeness of adjacent perforations. Each injection station 176 includes a piston 178, which is pulled upward by means of a cam 182, rotating in the direction of arrow 183, to be returned downward by a compression spring 184. When the piston 178 is pulled fully upward, a liquid catalyst is forced into a cylinder 186, in which the piston travels, from a supply channel 188 extending along the perforating station 172. When a return surface 190 of cam 182 passes an edge 192 of cam follower 194, piston 178 is returned downward. The first portion of this downward stroke closes the opening 196 between cylinder 186 and supply channel 188. Further downward motion of piston 178 forces the catalyst in cylinder 186 outward through a nozzle 198 at a velocity high enough to form a perforation in paper 170 moving under the perforating station 172. The paper 170 is supported by a support plate 200 having, under each nozzle 198, a hole 202 providing an opening into a reservoir 204. While the catalyst from reservoir 204 is recirculated and filtered, with the aid of a pump (not shown) through perforating station 172, the catalyst remaining in the fibers of paper 170 around the perforated holes thus formed is subsequently available to harden adhesive layer 94, as previously discussed in reference to FIG. 5.

Referring again to FIG. 10, paper 10 having moved through perforating station 172 is moved onward to a drying station 206, where heat is applied to dry the liquid portion of the catalyst. The heat may be derived from a radiant, convective, or forced air source, or from a combination of these. The web of paper 10 is relatively slack as it is moved through the perforation process and into drying station 206, due to the temporary weakness of the dampened paper sections extending between adjacent perforation holes.

Figure 12:
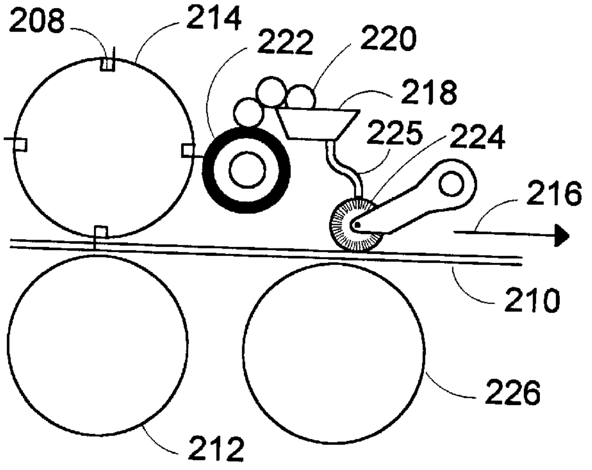
FIG. 12 is an elevation diagram of alternate apparatus used in the production of the paper stock of FIG. 1, in which perforated lines are formed by means of perforation wheels to which a catalyst has been applied.

Referring now to FIG. 12, an elevation view of an alternate method for applying the catalyst as transverse perforations 14 is shown. In this process, the transverse perforations 14 are formed by a number of knife edges, or a perforation bar 208, cutting through the paper 210 to an anvil roller 212. The perforation bars 208 are mounted in a perforating roll 214, which rotates with the paper 210 as it is moved in the direction of arrow 216. The catalyst is supplied to this process by means of a trough 218 in which the first of a series of doctor rolls 220 operates. The last of this series of doctor rolls 220 contacts a soft roll 222, which is thereby coated with a smooth layer of catalyst. The perforation bars 208 are moved in contact with the soft roll 222, to be in turn coated with the catalyst. Soft roll 222 may be coated with a carpet like fabric material or with an elastomeric foam. A perforation wheel 224, rolling near each edge of the paper 210 with a second anvil roller 226, is used to form the longitudinal perforated lines 19 of paper stock 10. To provide the configuration of paper stock to be used with a check book 86 shown in FIGS. 4 and 5, it is not necessary to apply catalyst to wheels 224. Through this method, the catalyst is driven directly into the perforation slots formed in the paper. Because the catalyst wets the ties of the perforations, thereby weakening the perforations, care should be taken to avoid placing tension on the perforations until the catalyst dries.

While the previously discussed processes for applying a catalyst have been discussed in particular relation to fabricating the paper stock 10 shown in FIG. 1, it is understood that these processes can also be applied to the fabrication of paper stocks having panels oriented in different manners for various particular purposes.

Figure 13:
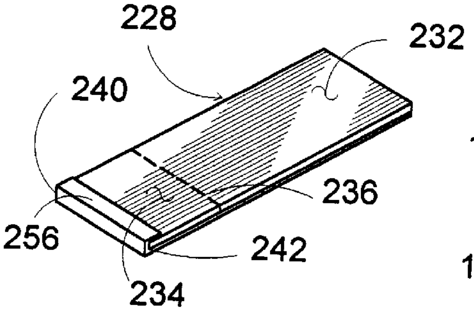
FIG. 13 is an isometric view of an alternative check booklet which may be printed using the apparatus of FIG. 2.

An important variation in the paper stock configuration will now be discussed, with particular references being made to FIGS. 13 and 14. FIG. 13 is an isometric view of an alternative check booklet 228, while FIG. 14 is an isometric view of a process applying a catalyst to a paper stock 230 for the alternative check book 228.

Referring first to FIG. 13, the alternative check book 228 includes, on a single sheet adjacent to each check panel 232, a check stub panel 234, separated from the check panel by a perforated line 236. The processes of printing and binding alternative check books 228 are similar to those processes described above in reference to FIGS. 1–5. A stack 238 of printed check panels 232, with attached stub panels 234 is bound with a card stock cover 240 having an adhesive layer 242, which may be covered with a tear away protective strip (not shown), in the manner previously discussed in reference to FIGS. 4 and 5.

Figure 14:
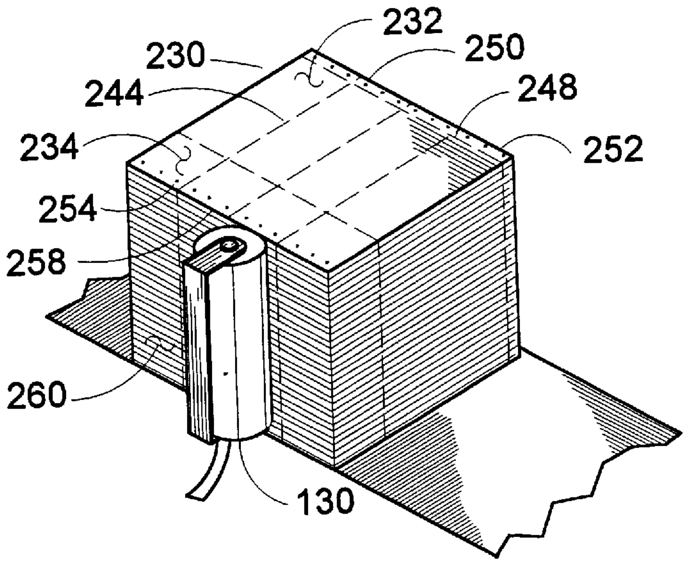
FIG. 14 is an isometric view of apparatus used in coating a catalyst along an outer edge of paper stock used in the preparation of the booklet of FIG. 13.

Referring to FIG. 14, paper stock 230 includes a number of transverse perforated lines 244 extending between adjacent check panels 232 and check stub panels 234, a longitudinal perforated line 236 separating the individual check panels 232 from adjacent check stub panels 234, and a longitudinal perforated line 248 separating check panels 232 from an edge strip 250 having pin drive holes 252. At the opposite side of paper stock 230, pin drive holes 254 extend through an edge portion of each check stub panel 234. That is, a marginal perforation is not provided for these pin drive holes 254.

Referring again to FIG. 13, as well as to FIG. 14, after the binding process, pin holes 254, extending through check stub panels, 234 lie under a front flap portion 256 of card stock 240. Thus, the only surfaces of paper stock 230 which come into contact with adhesive layer 242 are the outer edges 258 extending along check stub panels 234. None of the edges formed by separating perforated lines come into contact with adhesive layer 242. Thus only the outer edge 258, which is folded to form a surface 260 in the production process of FIG. 14, is coated with the catalyst. This can be done with a single roller 130, as shown in FIG. 14 and as discussed in reference to FIGS. 6 and 8. Alternatively, the spraying method discussed in reference to FIG. 9 may be used, with only one side being sprayed.

It should also be noted that the alternate checkbook 228 can be fabricated with equipment similar to that shown in FIG. 12 by eliminating the catalyst applying apparatus 220 and 222 shown and replacing it with apparatus to apply catalyst to perforation wheel 224. For example, a tube or wick 225 from trough 218 may be used to apply catalyst to the edge of perforation wheel 224. Thereafter, the edge strips are removed as previously described.

Since the alternate style of check booklet 228, with check stubs bound along a left edge, is still preferred by a number of banking customers over the style of check booklet 86 (shown in FIG. 5), it is desirable to be able to provide either type of check book based on customer preference.

Referring again to FIG. 2, the system for handling paper stock 10 may be configured to be easily switched between using paper stock 10 for the production of check booklets 86, and using paper stock 230 for the production of alternate style check books 228. Furthermore, a means is provided to disable one of the slitter wheels 54, so that only one longitudinal perforated line 248 is used to separate an edge strip 250 (both shown in FIG. 14). The additional slitter wheels 54 are easily disabled by movement along shafts to a position outside the path occupied by the paper stock 230.

Figure 15:
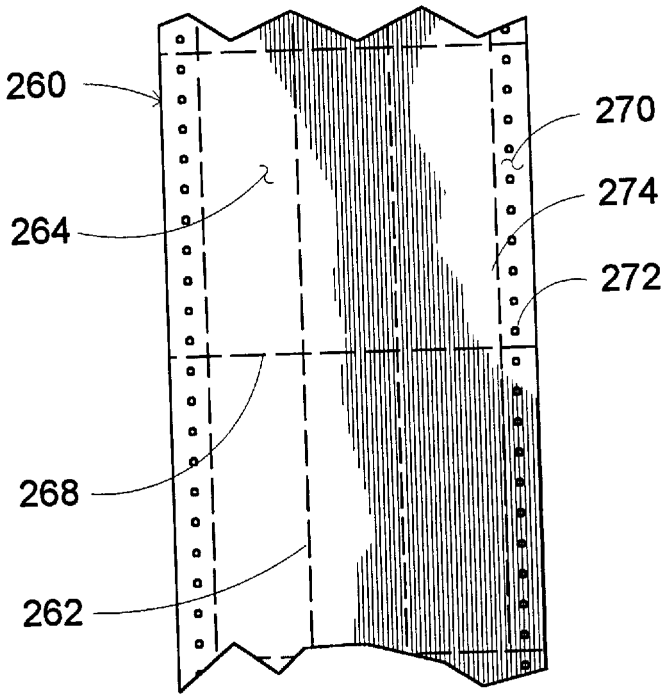
FIG. 15 is a plan view of paper stock used in the production of check booklets in accordance with an alternative embodiment of the present invention.
Figure 16:
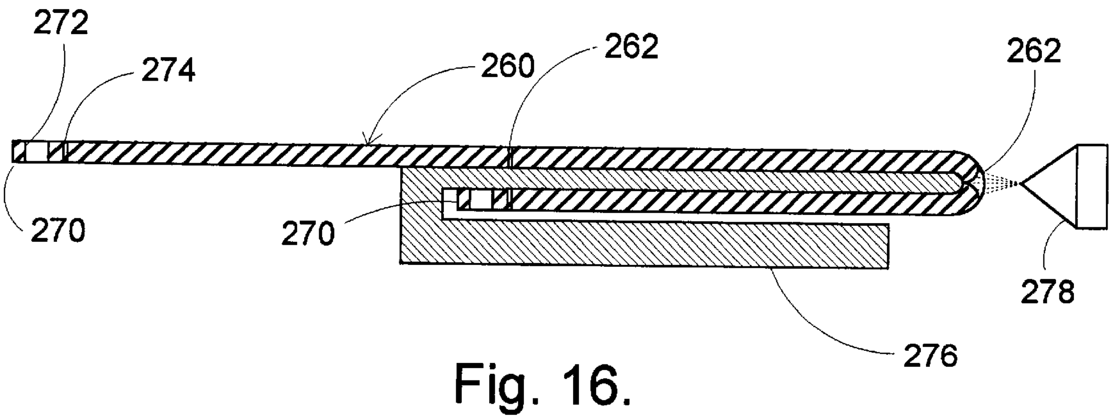
FIG. 16 is a transverse elevation view of apparatus used in coating a catalyst along folded edges at perforated lines of the paper stock of FIG. 15.
Figure 17:
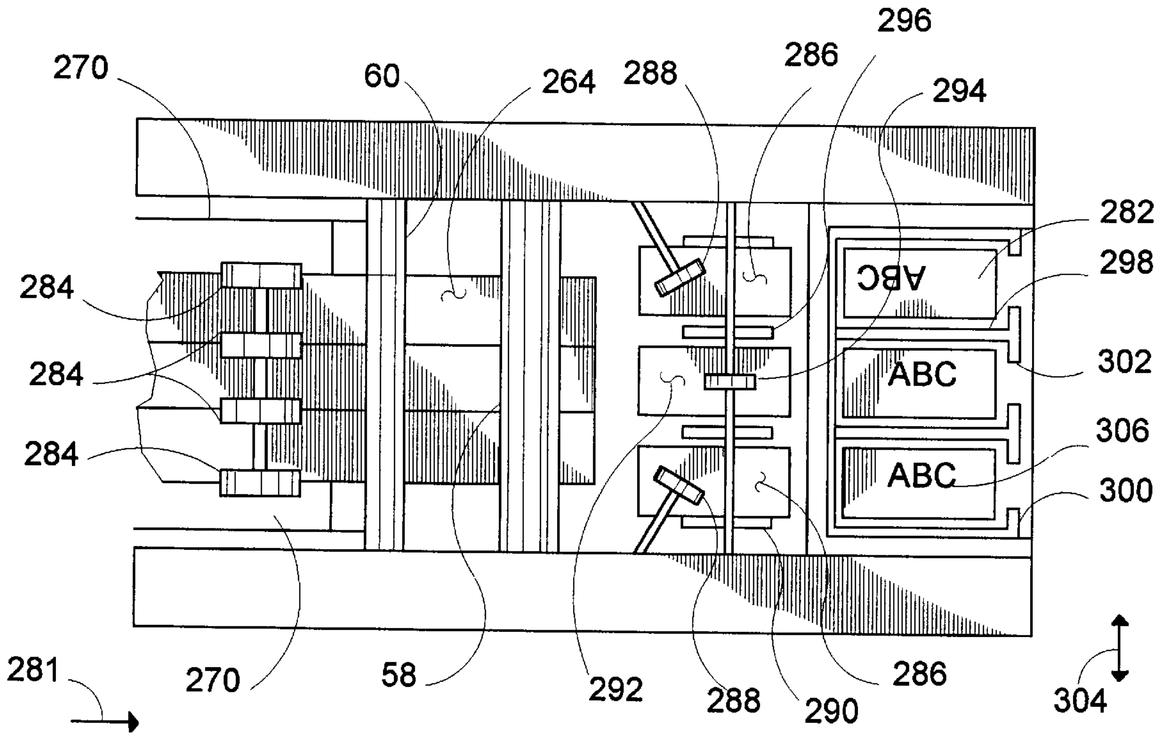
FIG. 17 is a plan view of an output handling mechanism for receiving printed checks in the apparatus of FIG. 2, as configured to use the paper stock of FIG. 15.

A process for producing check booklets in accordance with an alternate embodiment of the present invention will now be discussed in reference to FIGS. 15–17. FIG. 15 is a plan view of the paper stock 260 used in this embodiment, while FIG. 16 is a transverse elevation view showing the apparatus used to coat a catalyst on exposed perforations of longitudinal perforated lines 262 extending between check panels 264 in the paper stock 260. FIG. 17 is a plan view of an output handling mechanism for receiving printed checks in a version of the apparatus of FIG. 2 configured to use paper stock 260 of FIG. 15.

Referring first to FIG. 15, a paper stock 260 includes a number of longitudinally oriented check panels 264, extending in three longitudinal rows separated by longitudinal perforated lines 262. Within each such row, adjacent check panels 264 are separated by transverse perforated lines 268. Paper stock 260 also includes, along each edge, an edge strip 270, including pin drive holes 272, separated from the remainder of paper stock 260 by a longitudinal perforated line 274.

As shown in FIG. 16, the fabrication of paper stock 260 requires the application of a catalyst to the longitudinal perforated lines 262 extending between adjacent rows of check panels 264. This may be accomplished by folding the paper along the two longitudinal perforations 262, one at a time. In order to fold the paper stock 260, a guide 276 folds paper stock 260 approximately 180 degrees along perforation 262 from the position shown in FIG. 15 to the position shown in FIG. 16. At the point where paper stock 260 of completely folded, catalyst is applied from a catalyst applying station 278 in any of the manners previously described. Thereafter, the portion of the paper folded as shown in FIG. 16 is unfolded using guide 276 and the same procedure is used to fold paper stock 260 along the other perforation 262. Alternatively, the catalyst may be applied to perforations 262 as they are formed using the perforation wheel 224 and associated wick 225 as described with respect to FIG. 12.

Referring to FIG. 17, after the process of FIG. 16, paper stock 262 is opened into a flat configuration before folding in alternating directions along transverse perforated lines 268. The apparatus used to form check booklets, which has been described in reference to FIGS. 2 and 3, may be configured to handle paper stock 260 (shown in FIG. 15), moving in the direction of arrow 281, by providing for the production of stacks 282 of checks from three separate rows of longitudinally oriented check panels 264. Slitter wheels 284 are added to separate these rows of check panels 264 along longitudinally perforated lines 262, as slitter wheels 54 separate edge strips 270 for disposal. After check panels 264 are separated along transverse perforated lines by burster rolls 58 and burster bar 60, the individual outer check panels 286 are moved outward by rotationally driven angled drive wheels 288, to be slid along outer guide surfaces 290, while the individual center check panels 292 are moved by rotationally driven central drive wheels 294 between central guide surfaces 296. In this way, the check panels 286 and 292 are individually inserted into three cavities 298 of an output tray 300.

Various features of output tray 62, which have been described in reference to FIGS. 2 and 3, may be applied to output tray 300. For example, the contents of each of the three cavities 298 may be manually accessed by means of a slot 302, and the tray 300 may be transversely moved, in the directions indicated by arrow 304, upon the placement of twenty-five printed check panels 286 or 292 in each of the cavities 298.

In the printing processes, fixed and variable information is printed in the orientation indicated by letters 306, with outer check panels 286 being arranged to have upper edges extending along the lines resulting from splitting longitudinal perforated lines 262 (shown in FIG. 15). In this way, each printed check panel 286 and 292 has an upper edge which has been coated with a catalyst in the process of FIG. 16, allowing the subsequent assembly of finished check booklets as previously described in reference to FIGS. 4 and 5.

In using the methods of FIGS. 10–17, it is not necessary to fold paper stock 230 at each transverse perforated line 244 to expose an edge for coating with the catalyst. Therefore, the number of panels lying flat between folded perforations may be optimized to facilitate handling through the processes of manufacturing paper stock, shipping paper stock, and printing finished booklets. If desired, the paper stocks may even be wound into rolls.

A number of adhesive systems may be employed to provide the adhesive layer 94 (shown in FIG. 5) and the catalyst, the application of which has been described in reference to FIGS. 6–12, 14, and 16. While the material coated on the paper stock has been called a "catalyst," it may not be a catalyst in the strictest sense. This term has been used to avoid confusion, indicating particularly that a very small amount of the substance coated on the paper is used to start a chemical change in a relatively large amount of adhesive.

For example, a silicone resin may be solidified, or rendered non-tacky, by the reaction of a silane (—Si—H linkage) with either a silanol (Si—OH) or a vinyl silane ($CH_2$=CH—Si—).

Figure 18:
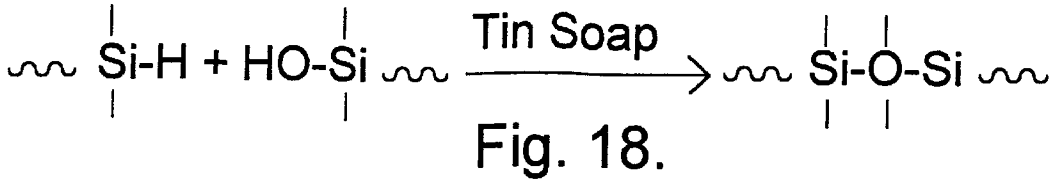
FIG. 18 is a diagram of a cross-linking reaction achieved when a mixture of silane ended resin and silanol ended resin in an adhesive layer of the cover of FIG. 4 is brought together with a paper edge impregnated with a tin catalyst.

As shown in FIG. 18, a cross-linking reaction is achieved with a mixture of a silane ended resin and a silanol ended resin when the paper edge is impregnated with a tin catalyst, such as a solid stannous octoate or a dibutyl dilaurate. In FIG. 18, the wavy lines represent the remaining portions of the silicone resin.

Figure 19:
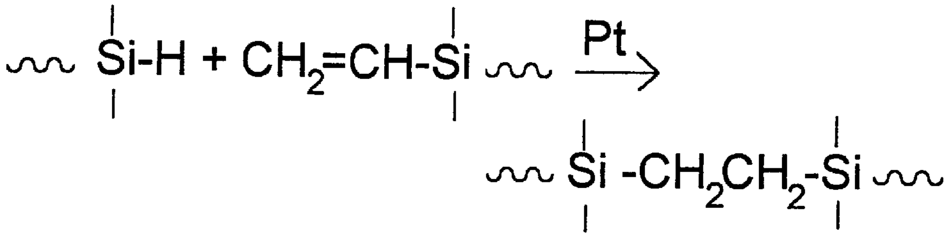
FIG. 19 is a diagram of a cross-linking reaction achieved when a mixture of silane ended resin and vinyl silane resin in the adhesive layer of the cover of FIG. 4 is brought together with a paper edge treated with a platinum catalyst.

As shown in FIG. 19, a cross-linking reaction is achieved with a mixture of a silane ended resin and a vinylsilane resin when the paper edge is treated with a platinum compound, such as chloroplatinic acid. For this cross-linking reaction, the platinum catalyst is effective at levels as low as five parts per million parts of adhesive resin.

Alternately, since natural rubber is cross-linked to a tack free state through the vulcanization process, the adhesive layer can be composed of rubber, sulfur, and zinc oxide in an aqueous dispersion. In this case, an accelerator is placed on the edge of the paper to speed the reaction of the rubber with sulfur. Typical accelerators of this type are zinc dibutylthiocarboxyl and zinc mercaptobenzthiazole, which are needed at a level of about one percent of the adhesive resin.

Alternatively, carboxylated neoprene latex, used in adhesives, may be cross-linked using curatives which react with carboxyl (acid) functionality. The most popular curative of this type is zinc oxide, which is, however, needed at a level of about two percent of the adhesive resin. Such a curative may be coated on the paper edges.

Figure 20:
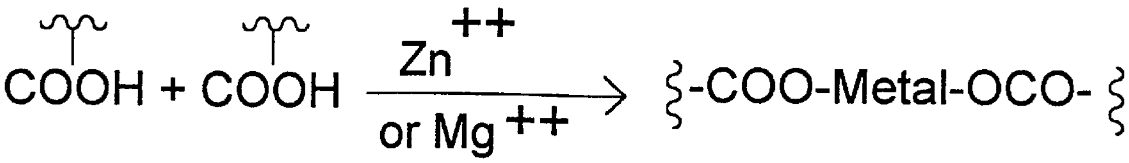
FIG. 20 is a diagram of a cross-linking reaction achieved when a carboxylated neoprene latex is brought together with a paper edge treated with a zinc or magnesium curative.

Referring to FIG. 20, a typical carboxylated neoprene latex, like Neoprene Latex 115, which can be applied with water, is a copolymer of chlorobudiene and methacrylic acid. In the curing process, the metal in the curative reacts with the acid groups.

Alternatively, an adhesive having reactive functional groups pendant to the chain may be used for the adhesive strip, while an acidic catalyst is present on the edges of the paper. These functional groups react with other functional groups or chemicals in the presence of the acidic catalyst. Two acidic catalysts, which can be used in this way as solid, stable compounds, are ammonium chloride and para-toluenesulfonic acid. The adhesive component is a mixture of acrylic polymers, one of which possesses epoxy (oxirane) groups, while the other possesses carboxylic groups. In the presence of the acidic catalyst, the two polymers form a cross-linked mass. For example, a pressure sensitive adhesive having carboxyl groups can be mixed in a low molecular di-epoxy compound or resin to form a tacky adhesive, which will cure to a hard mass when contacted by an acidic catalyst, such as para-toluenesulfonic acid.

Alternatively, carboxyl-containing resins are cured, or cross-linked, when they are reacted with aminoplasts, including urea-formaldehyde and melamime-formaldehyde resins, and closely related materials having the basic structural unit —$NHCH_2OH$. These N-methylol materials can be made more stable for storage if they are converted to ethers, such as —NH—$CH_2$—$OCH_3$. These N-methylol compounds or resins react with various functional groups, such as amino, alcohol, phenol, and carboxyl. The ether derivatives, called alkoxyaminoplasts, require acid catalysts at room temperature to enable their reactions. Thus, the adhesive layer may be composed of a carboxyl containing pressure sensitive adhesive, such as an acrylic, neoprene, or styrene-butadiene adhesive, with stabilized aminoplasts, to be cross-linked following contact with an acidic catalyst coated on the edge of the paper.

The printing process of the present invention, as described, for example, in reference to FIGS. 2 and 3, together with the binding process of the present invention, as described, for example, in reference to FIGS. 3 and 4, may be used by a branch bank to supply or re-supply checks for a customer with a new or existing account in an expedited basis. The booklets made in as described herein have the advantages over "starter checks" currently supplied by banks, in that the customer's name and address are pre-printed as part of variable information. This feature should make these checks widely acceptable. In fact, checks printed in this way have most if not all of the advantages of checks printed by organizations specializing in this activity. Many banks may want to use this type of equipment for all check production.

Further advantages over the background art may be obtained through the ability of the laser printer to produce a wide range of images. Checks may be imprinted with a photographic image of the customer, and traveler's checks may be imprinted with the "first signature," eliminating the need for the customer to sign each check to obtain the security available through the system.

While the invention has been described in a particular application of printing bank checks, it is understood that the invention may readily be applied for other purposes where a rapidly produced booklet with customized printed information is needed, such as loan coupon books, deposit slips and the like. Further, while the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. A process of producing booklets having a plurality of sheets contained in a cover, said sheets initially being in a configuration suitable for printing in which said individual sheets are separated by perforations, said cover having a first material on a portion thereof, said first material, when contacting a second material forming a bond, said method comprising the steps of:

affixing said second material through said perforations;

separating said sheets at said perforations, so that a first edge of each separated sheets has said second material affixed thereto;

aligning said first edges into a stack; and placing said stack in said cover so that said aligned first edges are against said first material.

2. The process according to claim 1 further including the step of printing on said sheets prior to separating said sheets.

3. The process according to claim 2 wherein said step of printing includes entering data related to variable information.

4. The process according to claim 1 wherein said method further includes maintaining said first edge against first material to permit a chemical reaction to occur to form said bond.

5. The process according to claim 4 further including the step of printing on said sheets prior to separating said sheets.

6. The process according to claim 1 wherein said step of affixing said second material includes fan folding said sheets at said perforations to form a stack having said perforations forming a side of said stack and applying said second material to said side.

7. The process according to claim 6 further including the step of printing on said sheets prior to separating said sheets.

8. The process according to claim 7 wherein said method further includes maintaining said first edge against first material to permit a chemical reaction to occur to form said bond.

9. The process according to claim 1 wherein said step of affixing includes forming said perforations.

10. The process according to claim 1 wherein said step of affixing said second material includes bending said sheets at said perforations prior to applying said second material.

11. The process according to claim 10 further including the step of printing on said sheets prior to separating said sheets.

12. The process according to claim 11 wherein said method further includes maintaining said first edge against first material to permit a chemical reaction to occur to form said bond.

13. A process for producing booklets having variable printed information comprising the steps of:

coating a catalyst on certain surface portions of a paper web;

feeding said paper web through a printer, printing said variable information on adjacent panels of said paper web;

separating said panels from each other, so that each of said panels after separation has a first edge formed along one of said certain surface portions;

stacking said panels such that each first edge of each panel is aligned and directed in a common direction; and placing said stack against an adhesive material coated on a binding cover, with each first edge held against said adhesive surface, wherein a hardening process within said adhesive material is begun by contact with said catalyst along each first edge.

14. The process of claim 13 wherein said paper web includes transverse perforated lines and said catalyst is coated on said transverse perforated lines.

15. The process of claim 14, wherein said step of coating a catalyst includes:

folding said web in alternating directions along adjacent transverse perforated lines, whereby opposite outer sides of a folded stack of said paper web are formed by folds of said web along said transverse perforated lines; and moving each outer side of said folded stack past a means for catalyst coating.

16. The process of claim 13, wherein said certain surface portions lie along an outer edge of said paper web.

17. The process of claim 16, wherein said step of coating a catalyst on certain surface portions includes:

folding said web in alternating directions along various of said transverse perforated lines, whereby said outer edge is folded to form an outer side of a folded stack of said paper web; and moving said outer side of said folded stack past a means for catalyst coating.

18. The process of claim 13:

wherein said paper web additionally includes longitudinal perforated lines;

wherein said certain surface portions lie along said longitudinal perforated lines;

wherein said step of separating adjacent panels from each other includes slitting said paper web along said longitudinal perforated lines; and wherein said process for producing booklets includes, after said step of separating adjacent said panels from each other, a step of forming a plurality of stacks composed of said panels, wherein, within each stack, each of said panels is aligned with said first edge directed in a common direction, and wherein said each of said plurality of stacks is formed of panels separated from each other along said transverse perforated lines.

19. The process of claim 18, wherein said step of coating a catalyst on certain surface portions includes feeding said paper web, folded downward along said longitudinal perforated lines, into contact with catalyst coating rollers, rolling along said longitudinal perforated lines.

20. The process of claim 13, wherein said step of coating a catalyst on certain surface portions includes:

feeding said paper web adjacent a plurality of nozzles; and forcing said catalyst through said nozzles, at a velocity sufficient to form perforations in said paper web, in pulses timed to produce transverse perforated lines in said paper web.

21. The process of claim 13, wherein:

said process of coating a catalyst on certain surface portions includes the steps of coating said catalyst on a plurality of punches arranged in a line, and moving said plurality of punches into engagement with said paper web to form a transverse perforated line in said paper web; and wherein said step of separating adjacent said panels from each other includes bursting said paper web along said transverse perforated lines.

* * * * *